(12) United States Patent
Radimirsch

(10) Patent No.: US 7,088,686 B1
(45) Date of Patent: Aug. 8, 2006

(54) RADIO METHOD AND DEVICE HAVING A FRAME STRUCTURE

(75) Inventor: Markus Radimirsch, Laatzen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/807,378

(22) PCT Filed: Oct. 12, 1999

(86) PCT No.: PCT/DE99/03273

§ 371 (c)(1),
(2), (4) Date: Jul. 9, 2001

(87) PCT Pub. No.: WO00/22756

PCT Pub. Date: Apr. 20, 2000

(30) Foreign Application Priority Data

Nov. 19, 1999 (DE) ................................ 198 46 730

(51) Int. Cl.
*H04B 7/005* (2006.01)
(52) U.S. Cl. ........................ 370/278; 370/478; 370/442
(58) Field of Classification Search ................ 370/490, 370/203, 346, 347, 252, 329, 389, 278, 337, 370/445, 328, 282, 344, 442, 478; 709/203, 709/226; 364/483
See application file for complete search history.

(56) References Cited

U.S. PATENT DOCUMENTS

| | | | |
|---|---|---|---|
| 5,107,492 A | | 4/1992 | Roux et al. |
| 5,305,308 A | | 4/1994 | English et al. |
| 5,329,531 A | * | 7/1994 | Diepstraten et al. ........ 370/347 |
| 5,461,627 A | * | 10/1995 | Rypinski ..................... 370/346 |
| 6,192,026 B1 | * | 2/2001 | Pollack et al. .............. 370/203 |
| 6,226,277 B1 | * | 5/2001 | Chuah ......................... 370/328 |
| 6,456,633 B1 | * | 9/2002 | Chen .......................... 370/490 |

FOREIGN PATENT DOCUMENTS

| | | |
|---|---|---|
| DE | 197 26 120 | 12/1998 |
| EP | 0 755 164 | 1/1997 |

* cited by examiner

*Primary Examiner*—John Pezzlo
(74) *Attorney, Agent, or Firm*—Kenyon & Kenyon LLP

(57) ABSTRACT

A radio device having a frame structure is proposed for transmitting digital data in a radio communication system, a multiframe being used, which is made of a plurality of containers. The duration of the multiframe can be selected in such a manner that, during this time, a data packet can be filled with voice data of a predetermined bit rate. A container can be selected to be large enough, that a complete transmission frame can be accommodated therein.

16 Claims, 6 Drawing Sheets

Send       Channel Listening in (Carrier Sense)

RADIO METHOD AND DEVICE HAVING A FRAME STRUCTURE

FIELD OF THE INVENTION

The present invention relates to a radio device having a frame structure, for transmitting digital data in a radio communication system.

BACKGROUND INFORMATION

Conventional methods in cellular technology allow a frequency band to be used simultaneously by a plurality of radio base stations. In such a radio communication system, several terminals are controlled by a central unit, e.g., a radio base station, which, however, can also be a terminal itself. This central unit defines a radio cell, which indicates the spatial dimensions of the coverage area of the central unit. In general, such radio cells are represented as hexagons or circles in plan view. Such a system is represented in FIG. 1.

FIG. 2 depicts a cellular network having radio cells R1 through R8. However, if a radio cell is now defined, the terminals and the central unit generate interference which extends beyond the boundary of the radio cell. This can completely or partially prevent the operation of a second radio cell that uses the same frequency channel. As an example, the same frequency could be used in radio cells R1 and R4 in FIG. 2. Because of the short distance, signals from R4 interfere with the operation of R1, and vice versa. This problem predominantly occurs when the number of allowed frequency channels is too low.

Various solutions have been proposed for this problem, which are essentially based on separating the radio channels in the frequency or code directions (FDMA and CDMA). Recently, there have also been proposals for separating the channels in the time direction. An example of this is the DECT system.

SUMMARY OF THE INVENTION

The present invention enables voice services to be supported by ATM, e.g., voice-over ATM. The present invention can further allow radio resources to be utilized effectively, since the outlay for overhead decreases due to the relatively large length of a transmission frame. In further refinements of the present invention, collisions can be resolved in a simple manner. The method according to the present invention is very well suited for operating sectorized radio cells.

DETAILED DESCRIPTION

A protocol (cf. D. Petras, A. Krämling, "MAC protocol with polling and fast collision resolution for an ATM air interface", IEEE ATM Workshop, San Francisco, Calif., August 1996; D. Petras, A. Krämling, A. Hettich, "MAC protocol for Wireless ATM: contention free versus contention based transmission of reservation requests", PIMRC' 96, Taipei, Taiwan, October 1996; D. Petras, A. Hettich, A. Krämling: "Design Principles for a MAC Protocol of an ATM Air Interface", ACTS Mobile Summit 1996, Granada, Spain, November 1996) of layer 2 (DLC layer), can be used for the exemplary embodiment(s) considered here. ATM cells may be used as data packets. However, it is also possible to use data packets of other protocols above the DLC layer, e.g., IP (Internet Protocol), Ethernet, or UMTS. In this case, a layer is introduced between the DLC layer and the protocol of the higher layer, which adapts the data packets of the higher layer to the requirements of the DLC layer.

Figure 1:
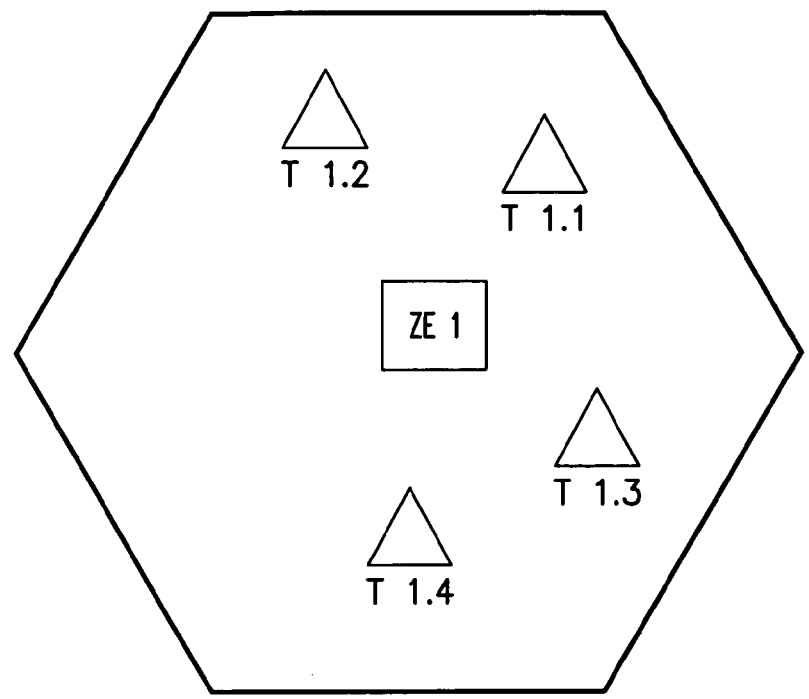
FIG. 1 shows a radio communication system in which several terminal are controlled by a central unit.
Figure 2:
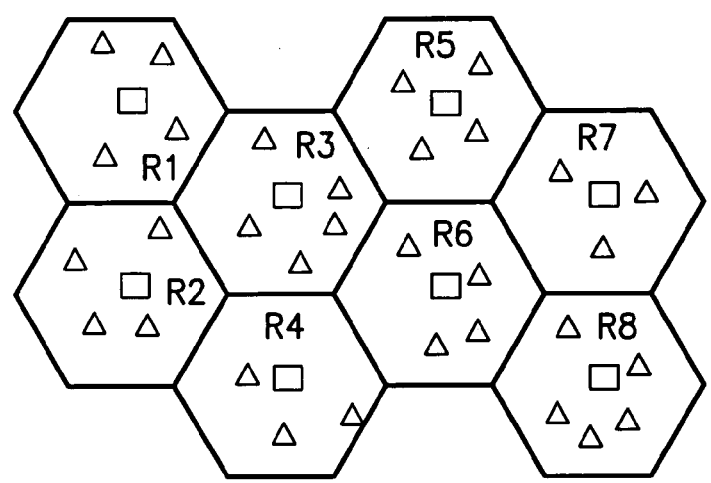
FIG. 2 shows a cellular network having radio cells R1 through R8.
Figure 3:
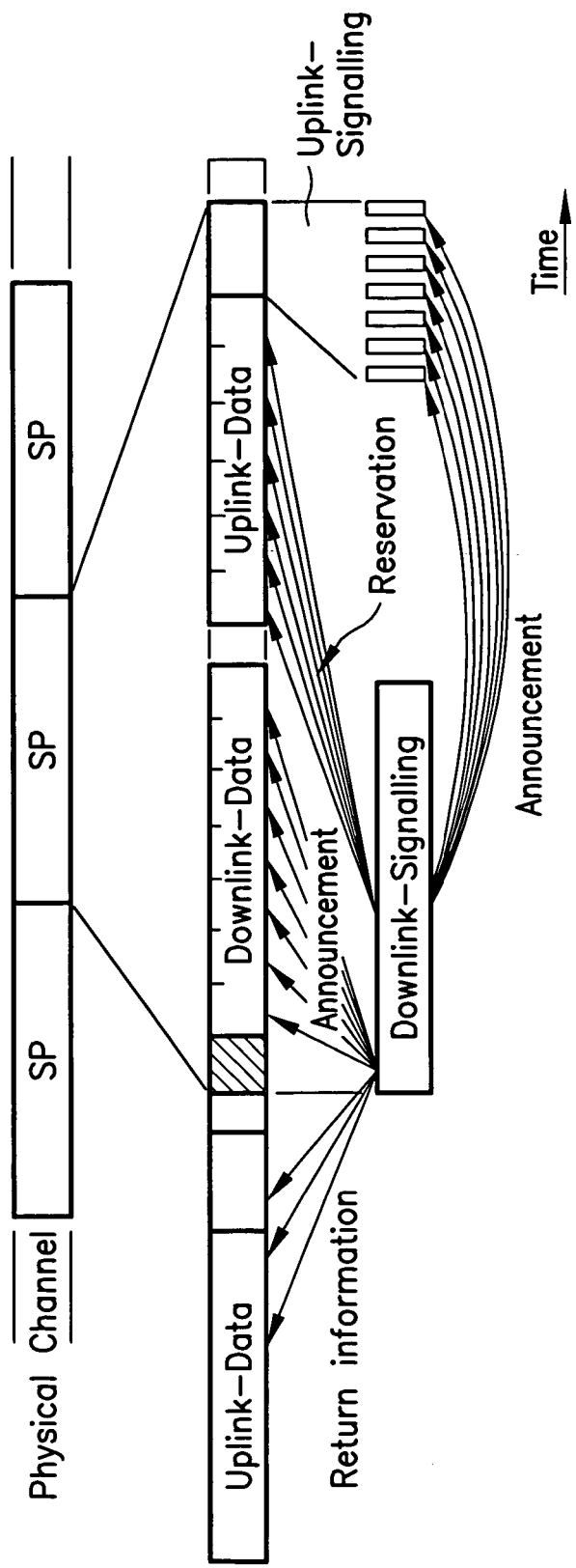
FIG. 3 shows a schematic signaling diagram for transmitted ATM cells in an embodiment of the present invention.

In accordance with FIG. 3, which shows the basic principle of the DSA protocol (dynamic slot assignment) described in detail in German Patent Application No. P 197 26 120.5, the transmission may take place according to the TDD (time division duplex) system. The physical channel is subdivided into time slots, which each receive a data burst. Such a data burst contains an ATM cell including the overhead for a training sequence, synchronization, forward error correction, FEC, and blocking times. In the downlink signaling burst, the central controller assigns each terminal a certain transmission capacity in the form of time slots, for a specific time interval known as SP (signaling period), as a function of the transmission resource requirements of the terminal. The total number of slots of an SP can be variable, and can vary over time. Or, the duration of the SP can be fixed, and the occupancy can be flexible.

An uplink phase includes a number of bursts transmitted by the terminals, and an uplink signaling phase. During the uplink signaling phase, the terminals are authorized to send signaling messages to the central controller, when they have not been allocated any reserved time slots for transmitting inside the normal bursts (piggy-back method). Polling or random access can be used for the uplink signaling. In the downlink phase, the signaling PDU (protocol data unit) and all of the bursts from the central controller are sent to the terminals. All of the sets of information for the next SP, including the signaling slots, are transmitted to the terminals, inside a signaling PDU. In addition, the signaling PDU contains feedback messages for previously emitted sets of uplink signaling information which, for example, can be used for a collision resolution or functions such as automatic requests for repeat (ARQ). Using these sets of information, the terminals can know when they are allowed to send and receive bursts. When different types of bursts, e.g., short or long, are used, the type of burst is announced by the central controller, inside the signaling PDU.

The reason for using such a protocol of the DLC layer is the necessity of ensuring the quality of service for ATM traffic.

See also D. Petras et al., "Support of ATM Service Classes in Wireless ATM Networks", ACTS Mobile Communications Summit, Aalborg, Denmark, October 1997. A centrally controlled MAC protocol can be used which, till now, has not been utilized in this manner in any radio communication system. On the other hand, a condition for this is that the methods already introduced for the common usage of frequencies, such as, e.g., the DECT method, cannot be used here.

One method for assigning channels in wireless ATM networks is described in A. Krämling at al., "Dynamic Channel Allocation in Wireless ATM Networks", International Conference on Telecommunications (ICT 98), Greece, June 1998 ("ICT 98 reference"). It also lists the reasons why existing methods cannot be used. The use of the term "frame" in the ICT 98 reference is different from its use in connection with the specification of the present invention. What is referred to here as a frame (transmission frame) is referred to there as a signaling period; what is referred to as a frame in the ICT 98 reference is called multiframe below, so that a multiframe can include a plurality of containers.

The method according to the ICT 98 reference relates to frames having a flexible duration, even when the simulations are carried out using a fixed frame duration. However, the use of a fixed frame duration is especially important in connection with the present invention.

In the ICT 98 reference, a frame is divided up among several containers. This requires a very large administrative outlay for the time-related control, both in central unit ZE and in the terminals. In addition, the ICT 98 reference does not indicate any specific duration for a multiframe. The service in ATM networks is the voice service. Voice has a low processing speed, e.g., <=64 kbit/s, but, in return, has very high demands on the end-to-end delay of the packets, as well as on the variance of this delay. If it is assumed that the end-to-end delay is limited to 50 ms, then each network element can generate a certain portion of this delay. In the case of the wireless transmission system, this amounts to 5 ms for the delay and approximately 2 ms for the delay variance. In addition, it must be taken into account that, in the case of 64 kbit/s, an ATM cell is filled approximately every 6 ms. This depends on the AAL (adaption layer) used. An ATM cell contains 48 useful bytes, from which AAL5 uses 1 byte, AAL1 uses 2 bytes, and AAL2 uses 3 bytes, so that only 47, 46 or 45 useful bytes, respectively, are available. This results in a filling time of AAL5=5.875 ms, AAL1=5.75 ms, and AAL2=5.625 ms. If, for voice connections, at least one container is not available for a voice connection, within the interval of the filling time, it is not possible to support voice services using ATM (voice-over ATM). Therefore, the present invention provides for using a multiframe that may have a data-packet filling time of approximately 6 ms or multiples thereof.

The present invention provides using one container per radio sector, each container transmitting a complete frame (transmission frame). Taking the 6 ms filling time into consideration for voice connections allows the radio resources to be utilized more efficiently, since the outlay for overhead decreases due to the relatively large length of a frame.

The present invention further provides for incorporating voice services into the division of a multiframe into several containers, in such a manner, that the duration of a multiframe corresponds to time period during which a data packet, e.g., an ATM cell, is filled with voice data of, e.g., a 64 kbit/s connection. As a refinement according to the present invention, the time needed to fill an ATM cell with voice information ($T_F$) approximately corresponds to the duration of a multiframe. Then, the following applies:

$T_F = T_S$

The duration of a single frame $T_R$ is calculated from the duration of a multiframe $T_S$, divided by the number of frames per multiframe ($N_R$):

$T_R = T_S / N_R$

Thus, the result is that the duration of a container $T_C$ is equal to the duration of a frame:

$T_C = T_R$

Figure 4:
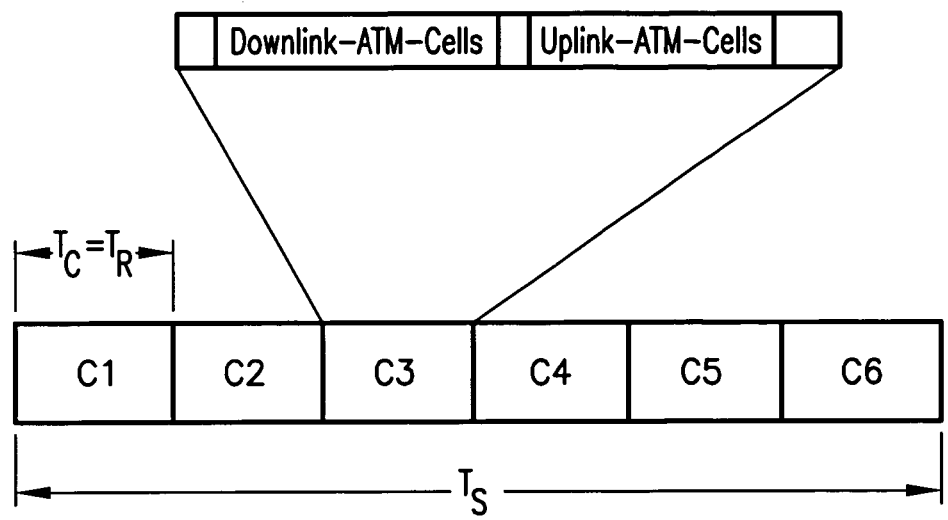
FIG. 4 shows the structure of a multiframe in an embodiment of the present invention.

This factual situation is represented in FIG. 4. In the indicated example, multiframe S is subdivided into six containers C1 . . . C6. However, other numbers of containers are also possible.

Figure 5:
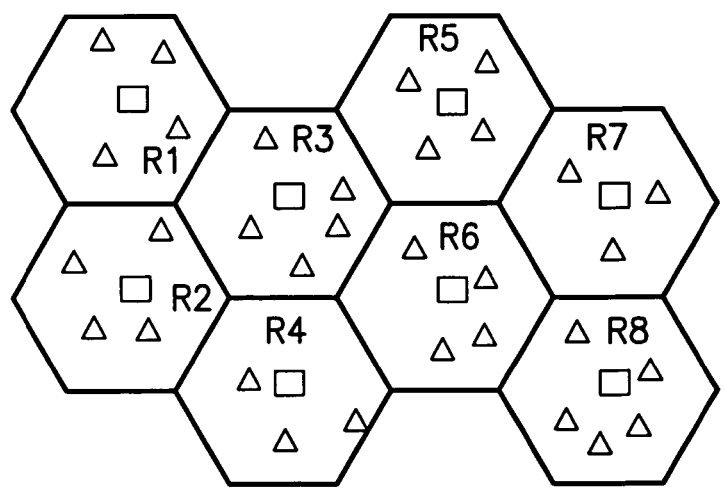
FIG. 5 shows the layout of a cellular network in an embodiment of the present invention.
Figure 6:
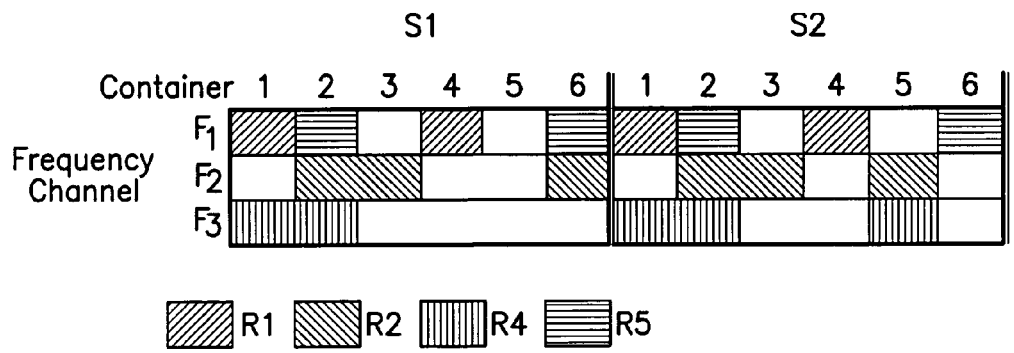
FIG. 6 shows an instantaneous survey of the occupancy of a container inside a transmission frame in an embodiment of the present invention.

The following forms the basis of a cellular network as shown in FIG. 5. Three frequency channels are available, and a multiframe includes six containers. In this example, radio cells R1, R2, R4, and R5 are initially active, an instantaneous survey of the utilized frequencies and containers being shown in FIG. 6. Central units ZE in radio cells R1, R2, R3, and R4 are in a steady state, so that the utilized containers do not change much from frame to frame. The required transmission capacity of central unit ZE in radio cell R4 has increased prior to the shift from multiframe S1 to multiframe S2, so that radio cell R4 occupies another container in multiframe S2, namely container C5 on frequency channel F3. In the next step, central unit ZE in radio cell R3 goes into operation. It can initially monitor the channel for a certain period of time, e.g., at least for the duration of a multiframe, and determine that the frequency channels are occupied in the manner represented in FIG. 6. In this context, it is not important that central unit ZE in radio cell R3 knows the numbering of the containers, for the boundary of the multiframe must still be detected.

It can be useful in the present invention to recognize the time-related boundaries between the containers. The periodicity of the pattern can be revealed by monitoring a single multiframe, from the known duration of a multiframe, which all central units ZE working in these frequency channels must know.

Figure 7:
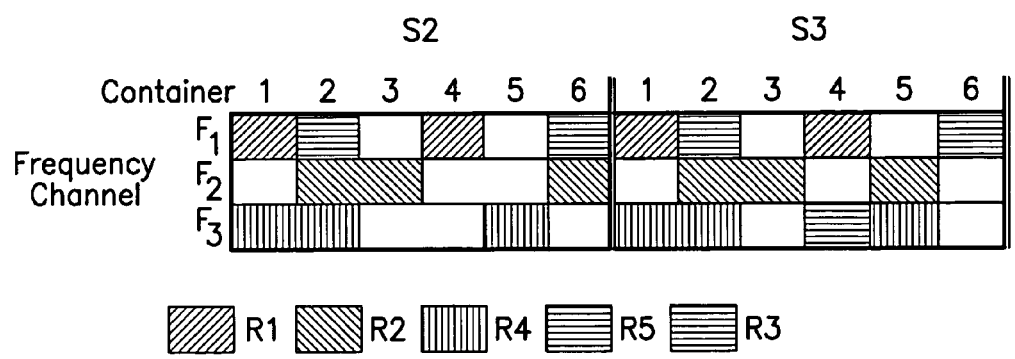
FIG. 7 shows an instantaneous survey according to FIG. 6, after the addition of a further radio cell, in an embodiment of the present invention.

From the result of monitoring multiframe S2, central unit ZE may conclude that, inter alia, containers C3, C4, and C6 of frequency channel F3 are free, and initially occupies container C4 of frequency channel F3, in multiframe S3. The resulting pattern of the used containers is shown in FIG. 7.

It may be assumed that radio cell R3 would have monitored multiframe S1, and determined that container 5 of frequency channel F3 is free, and would have decided to occupy this in multiframe S2. In this case, there would have been a collision between central unit ZE in radio cell R5, and central unit ZE in radio cell R3, which, in this case, had used the same container. In order to prevent this, a method utilized, e.g., in Ethernet-based LAN's, can be put into use. This method is known as CSMA/CD (carrier sense multiple access/collision detection; see IEEE 802.3), and means that, in response to the detection of a collision, the two central units ZE immediately refrain from occupying the container, and attempt to gain access to this container, or another free container which can be on a different frequency channel, after a period of time individually ascertained by each central unit in accordance with a random process. However, this method is the collision detection by the transmitting devices, themselves. Therefore, the CSMA/CA method (carrier sense/collision avoidance) was developed for the MAC layer in wireless LAN's.

Methods, which have been developed for competition-based MAC protocols for use in wireless LAN's (local area networks), and have already been standardized, are an additional possibility for preventing collisions while containers are being occupied. These methods can be based on the so-called CSMA/CA principal (carrier sense multiple access/collision avoidance). Such methods are used in the standards of HIPERLAN type 1 and IEEE 802.11 systems, see also ETSI RES 10, "Radio Equipment and Systems (RES); High Performance Radio Local Area Network (HIPERLAN) Type 1; Functional specification", 1996; and IEEE 802.11, "Tutorial of draft standard 802.11/D3.0, Part 3: the MAC entify", http://grouper.ieee.org/groups/802/11/main.htm#tutorial. The purpose of the CSMA/CA method used in these standards is to describe a procedure, which determines how several devices wanting to communicate with each other divide the commonly used channel, and access it. In the case of the present invention, the method provides that the devices not wanting to communicate with each other use the CSMA/CA method for occupying channels in order to not get in the way of each other. This allows devices, whose communication methods are different, and which can therefore not communicate with each other, to share a frequency band in the described manner.

In contrast to the methods described in ETSI RES 10, "Radio Equipment and Systems (RES); High Performance Radio Local Area Network (HIPERLAN) Type 1; Functional specification", 1996; and IEEE 802.11, "Tutorial of draft standard 802.11/D3.0, Part 3: the MAC entify", http://grouper.ieee.org/groups/802/11/main.htm#tutorial, it is not necessary within the framework of the method according to the present invention, that the access is granted in a priority-controlled manner. Rather, it is sufficient for each central unit ZE to select one or more randomly chosen times at which they access the new container, and otherwise, monitor to determine if another central unit ZE is accessing it as well.

Another embodiment of the present invention can involve using an entire container for collision prevention. For example, this can be useful when the duration of a container corresponds to an entire frame because, after the collision prevention phase, no more complete frames fit into the container, anyway. In this case, a central unit ZE wanting to reserve a container sends a signal at irregular and randomly selected time intervals, the signal being used to announce that the central unit wants to occupy the container in the following multiframes. Between the individual emissions, it monitors the container to determine if another central unit wants to occupy the container as well. If it determines that this is the case, then the central unit ZE that noticed the collision withdraws and proceeds as described above:

A new attempt to access this container or another free container that can be on another frequency channel, after a period of time individually ascertained by each central unit ZE, in accordance with a random process.

Figure 8:
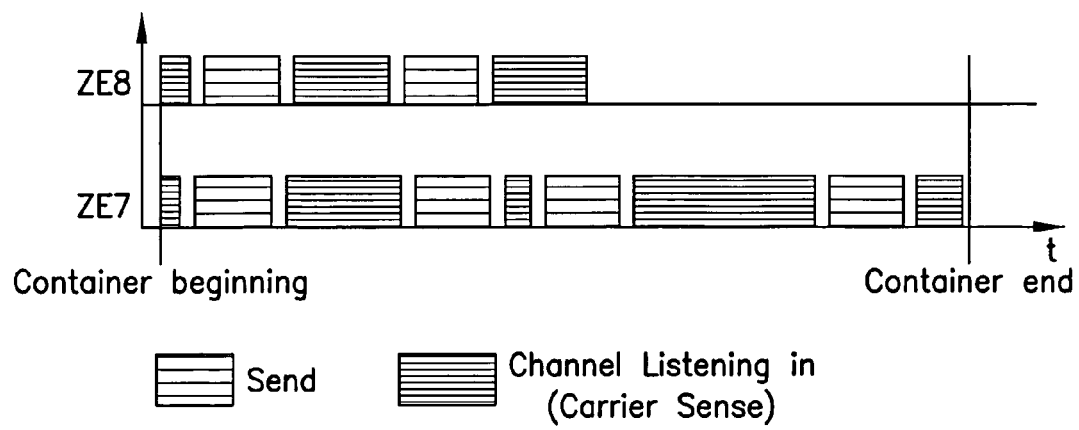
FIG. 8 shows a collision resolution within a container, in an embodiment of the present invention.

An example for such a collision resolution is shown in FIG. 8. Central units ZE7 and ZE8 which, for example, could come from FIG. 5, attempt to occupy the same container. To that end, both of them switch between monitoring the channel and emitting a signal, by means of which the channel should be occupied. In general, it is not possible to switch over between transmitting and receiving without a time-related pause. This is represented in the drawing by a time gap between transmitting and monitoring the channel (transceiver turnaround interval, TTT). The two central units ZE initially monitor the channel. Then, they begin to transmit in a slightly time-staggered manner. However, because of the TTT, the two do not notice that a second one is also transmitting. They both transmit a second time, almost simultaneously, and in so doing, do not notice each other. During the third time, central unit ZE7 selects a shorter time interval than that of central unit ZE8, so that central unit ZE8 hears central unit ZE7 and gives up attempting to occupy the container. Since central unit ZE7 did not detect the access attempt of central unit ZE8, it continues the procedure up to the end of the container.

The method for preventing collisions can also be used to resolve the hidden station problem. In this case, a central unit ZE1 is already using the container, but is not heard by a central unit ZE2 that wants to occupy the container, because, e.g., the central unit is momentarily not in the range of reception. However, it could be, that a terminal communicating with central unit ZE1 does, in fact, hear central unit ZE2, and that the occupation of this container by central unit ZE2 can interfere with its communication with central unit ZE1. In this case, it can be useful when the terminal thwarts the access attempt of central unit ZE2, by transmitting in a transmit break of central unit ZE2 (see FIG. 8), even when this causes it to briefly interfere with the communication in the radio cell formed by central unit ZE1.

Another embodiment of the present invention for the hidden station problem involves increasing the monitoring interval (carrier sense). Since a terminal does not necessarily transmit in each frame, a central unit ZE can easily assume the container to be free after monitoring it one time. For that reason, the monitoring time must be increased prior to the occupation of a container, in such manner, that there is a high probability of an active terminal transmitting at least once within this monitoring time. Then, the central unit concerned about the container recognizes that this container is already being used, and that its own occupation would interfere with the communication in other radio cells.

Figure 9:
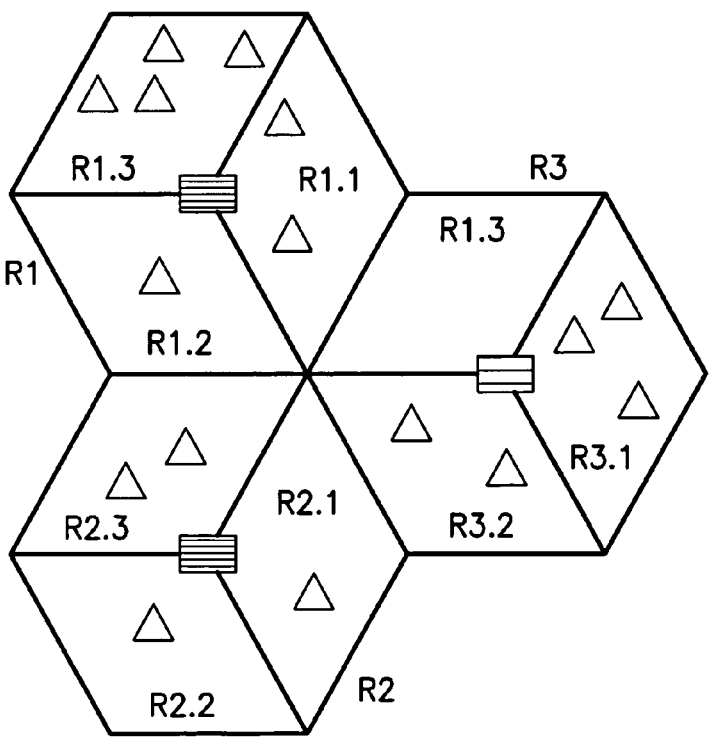
FIG. 9 shows sectored radio cells in an embodiment of the present invention.
Figure 10:
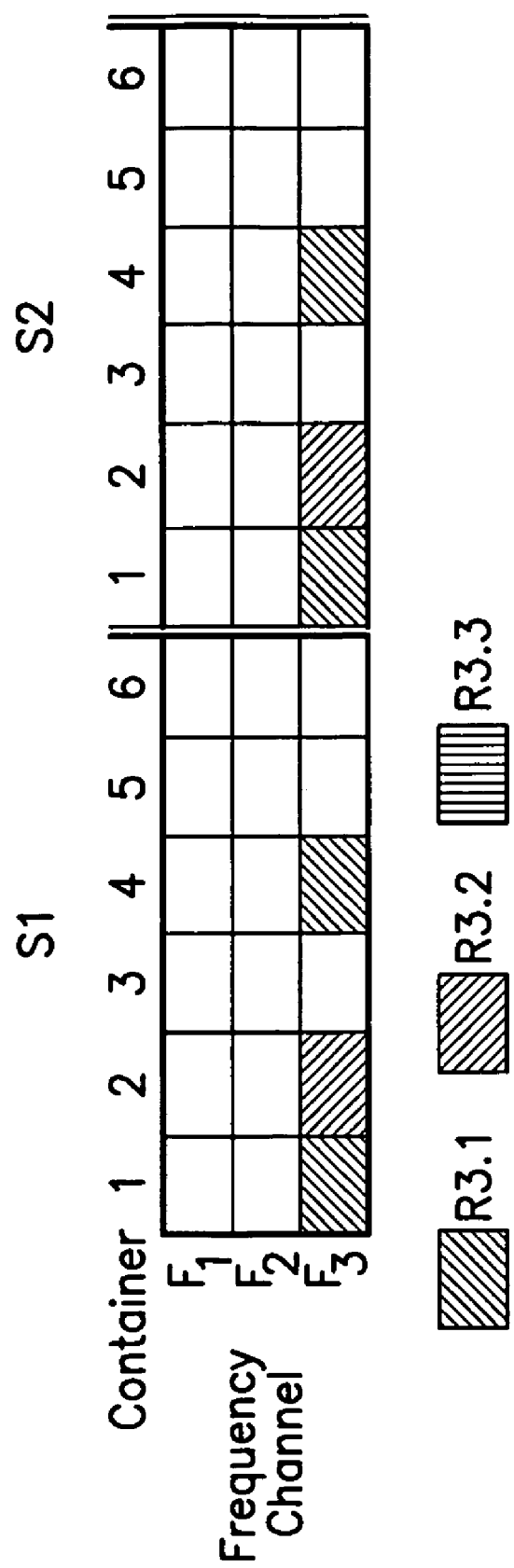
FIG. 10 shows the container occupancy for a particular radio cell in an embodiment of the present invention.

The above-described method of the present invention can also be suited for use in sectored radio cells. An embodiment of such a system is represented in FIG. 9. A central unit ZE is located in the middle of each radio cell, each radio cell being divided into three sectors. Residing in each of the sectors are zero terminals, one terminal, or several terminals, which want to communicate with central unit ZE. It can initially be assumed that central unit ZE controls all of the sectors, using only one frequency. The result for radio cell R3 is the occupation of containers in frequency channel F3, as shown in FIG. 10. The container occupancies of radio cells R1 and R2 are not represented. Sector R3.1 occupies containers C1 and C4, sector R3.2 occupies container C2, and sector R3.3 does not occupy any container, since there is no terminal located in it.

The sectoring reduces interference between the radio cells. This is primarily based on the directionally selective effect of sectoring the radio cells. Thus, e.g., in certain usage scenarios, it is possible for container C2 of frequency channel F3 to already be used again in sector R1.3. In the overall view of a cellular network, this considerably increases the reuseability of frequencies by reducing the interference.

Is also possible to carry out the measures of the present invention that are indicated above, when the duration of a multiframe is a multiple of filling time $T_F$. In this case, a central unit ZE, which must support at least one voice connection, can occupy containers having time interval $T_F$. It is also possible for these containers not to exactly have time interval $T_F$, but rather to approximately have interval $T_F$, the time discrepancy being limited by the allowed delay variance (cell delay variation, CDV) of the voice connection.

In the above exemplary embodiments, the container occupancy of a central unit ZE can be principally limited to one frequency, i.e., various containers of a single frequency were occupied. However, it is also possible (see the ICT 98 reference), that one ZE occupies several containers lying on different frequencies. This is also possible in the case of sectored radio cells. If there is only one transmitter/receiver unit in central unit ZE, the transceiver turnaround time should generally be considered, which can lead to a container which is not being used by central unit ZE having to lie between occupied containers on different frequencies channels. However, under the condition of one ZE having more than one transmitting and receiving branch, it is possible for one ZE to use different containers on different frequency channels, which coincide or lie one behind the other.

LITERATURE

[1] D. Petras, A. Krämling, "MAC protocol with polling and fast collision resolution for an ATM air interface", IEEE ATM Workshop, San Francisco, Calif., August 1996

[2] D. Petras, A. Krämling, A. Hettich, "MAC protocol for Wireless ATM: contention free versus contention based transmission of reservation requests", PIMRC' 96, Taipei, Taiwan, October 1996

[3] D. Petras, A. Hettich, A. Krämling: "Design Principles for a MAC Protocol of an ATM Air Interface", ACTS Mobile Summit 1996, Granada, Spain, November 1996

[4] D. Petras et al., "Support of ATM Service Classes in Wireless ATM Networks", ACTS Mobile Communications Summit, Aalborg, Denmark, October 1997

[5] A. Krämling at al., "Dynamic Channel Allocation in Wireless ATM Networks", International Conference on Telecommunications (ICT 98), Greece, June 1998

[6] ETSI RES 10, "Radio Equipment and Systems (RES); High Performance Radio Local Area Network (HIPER-LAN) Type 1; Functional specification", 1996

[7] IEEE 802.11, "Tutorial of draft standard 802.11/D3.0, Part 3: the MAC entify", http://grouper.ieee.org/groups/802/11/main.htm#tutorial

What is claimed is:

1. A method having a frame structure for transmitting digital data in a radio communication system, the radio communication system including a plurality of central units, each of the central units assigned a plurality of subscribers, the plurality of subscribers including digital voice services, each of the digital voice services being accommodated in a data packet inside the frame structure, the method comprising:
   providing multiframes, each of the multiframes being divided into a plurality of containers, each of the containers being selected to be so large that a complete transmission frame, including at least one of an uplink data packet and a downlink data packet, and corresponding signaling data, can be accommodated in a single one of the containers;
   monitoring by a first one of the central units at least one complete one of the multiframes;
   determining free capacity of frequency channels for further multiframes as a function of the monitoring;
   occupying one of the frequency channels that has free capacity;
   when there is a collision with a second one of the central units, the second one of the central units using a same time slot and a same frequency channel for a transmission frame as the first central unit, at least one of the first one of the central units and the second one of the central units: i) immediately refraining from occupying the time slot, and ii) attempting occupation again after a time lag.

2. The method as recited in claim 1, wherein different ones of the central units can occupy a selected time slot, the method further comprising:
   providing a collision prevention measure.

3. The method as recited in claim 2, further comprising:
   carrying out radio communication by using a centrally controlled protocol, the centrally controlled protocol being one of a MAC protocol, an Internet protocol, an Ethernet protocol and an UMTS protocol.

4. The method as recited in claim 2, further comprising using the preventive collision measure to resolve a hidden station problem and a terminal having an occupation attempt transmitting in a transmit break of the first central unit attempting occupation, the hidden station problem including a relatively unnoticeable terminal which lies outside a radio reception range of the first central unit and the first central unit operates outside of a radio reception range of a second central unit.

5. The method as recited in claim 1, further comprising providing a radio cell of the radio communication system, the radio cell being assigned at least one of the containers and at least one of the frequency channels.

6. The method as recited in claim 2, wherein a carrier sense multiple access/collision avoidance (CSMA/CA) method is used for the collision prevention measure.

7. The method as recited in claim 1, further comprising:
   selecting by the at least one of the first central unit and second central unit the lag time in a random manner.

8. The method as recited in claim 1, wherein occupying step includes reserving an entire container for a multiframe.

9. The method as recited in claim 1, wherein the radio communication system includes sectored radio cells.

10. The method as recited in claim 1, wherein each of the central units only occupies one container per radio sector.

11. The method as recited in claim 1, wherein the first central unit occupies more than one of the containers in at least one of the frequency channels.

12. The method as recited in claim 1, further comprising:
   occupying by the first central unit selected containers on different ones of the frequency channels using several transmission and reception branches, the selected containers coinciding or lying one behind the other.

13. The method as recited in claim 1, further comprising:
   using an ATM cell as the data packet accommodating digital voice services.

14. The method as recited in claim 1, further comprising selecting a duration at least as long as a multiframe for the monitoring by the first central unit to provide a high probability of an active terminal transmitting once during this duration.

15. A method having a frame structure for transmitting digital data in a radio communication system, the radio communication system including a plurality of central units, each of the central units assigned a plurality of subscribers, the plurality of subscribers including digital voice services, each of the digital voice services being accommodated in a data packet inside the frame structure, the method comprising:
   providing multiframes, each of the multiframes being divided into a plurality of containers, each of the containers being selected to be so large that a complete transmission frame, including at least one of an uplink data packet and a downlink data packet, and corresponding signaling data, can be accommodated in a single one of the containers;

transmitting by a first one of the central units a signal in irregular intervals, the signal announcing that the first one of the central units wants to occupy one of the containers in a following multiframe;

between transmissions by the first one of the central units, determining by the first one of the central units if another one of the central units wants to occupy a same one of the containers that the first one of the central units wants to occupy; and if another one of the central units wants to occupy the same one of the containers, withdrawing by the first one of the central units and attempting occupation again after a lag time.

16. The method as recited in claim 15, wherein the transmitting step includes transmitting the signal in random intervals.

* * * * *